United States Patent [19]

Hansen

[11] 4,285,567
[45] Aug. 25, 1981

[54] AUTOMATIC BIAXIAL SUN TRACKING MECHANISM FOR SUN RAY UTILIZATION DEVICES

[76] Inventor: Paul A. Hansen, 435 Dogwood Rd., West Columbia, S.C. 29169

[21] Appl. No.: 105,386
[22] Filed: Dec. 19, 1979
[51] Int. Cl.³ .......................... G02B 7/18; F16H 21/44
[52] U.S. Cl. ............................................ 350/83; 74/96
[58] Field of Search ...................... 350/83, 289; 353/3; 126/424, 425; 74/96, 104

[56] References Cited

U.S. PATENT DOCUMENTS

| 3,070,643 | 12/1962 | Toulmin | 126/425 |
| 3,893,746 | 7/1975 | McMahon | 350/83 |

*Primary Examiner*—Jon W. Henry

[57] ABSTRACT

The instant invention is an automatic biaxial sun tracking mechanism for use with sun ray utilization devices. Said devices are mounted on said invention, said devices forming no specific part of said invention.

The invention is comprised of four principal parts: (1) a mount structure for positioning and supporting said sun ray utilization devices, (2) a polar shaft, (3) a declination crankshaft, and (4) suitable connecting members.

Operation of the invention is as follows: The daily axis of said polar shaft is oriented parallel to the earth's polar axis. Said connecting members hold in a mutually perpendicular arrangement the daily axis of said polar shaft, the seasonal axis of a pivot pin for said mount structure, and the main journal axis of said declination crankshaft. Said connecting members with attached parts have suitable means to rotate about said daily axis one revolution per day. Said crankshaft has suitable means to rotate about said main journal axis one revolution per year. A suitable linkage, which simultaneously engages said crankshaft and said mount structure, serves to translate the rotary motion of said crankshaft into alternating pivotal motion of said mount structure.

Modifications to the basic "direct tracking" form of the invention may be made for "indirect tracking," heavy duty crankshaft and associated parts, and corrective compensation for a variety of rotational means.

9 Claims, 4 Drawing Figures

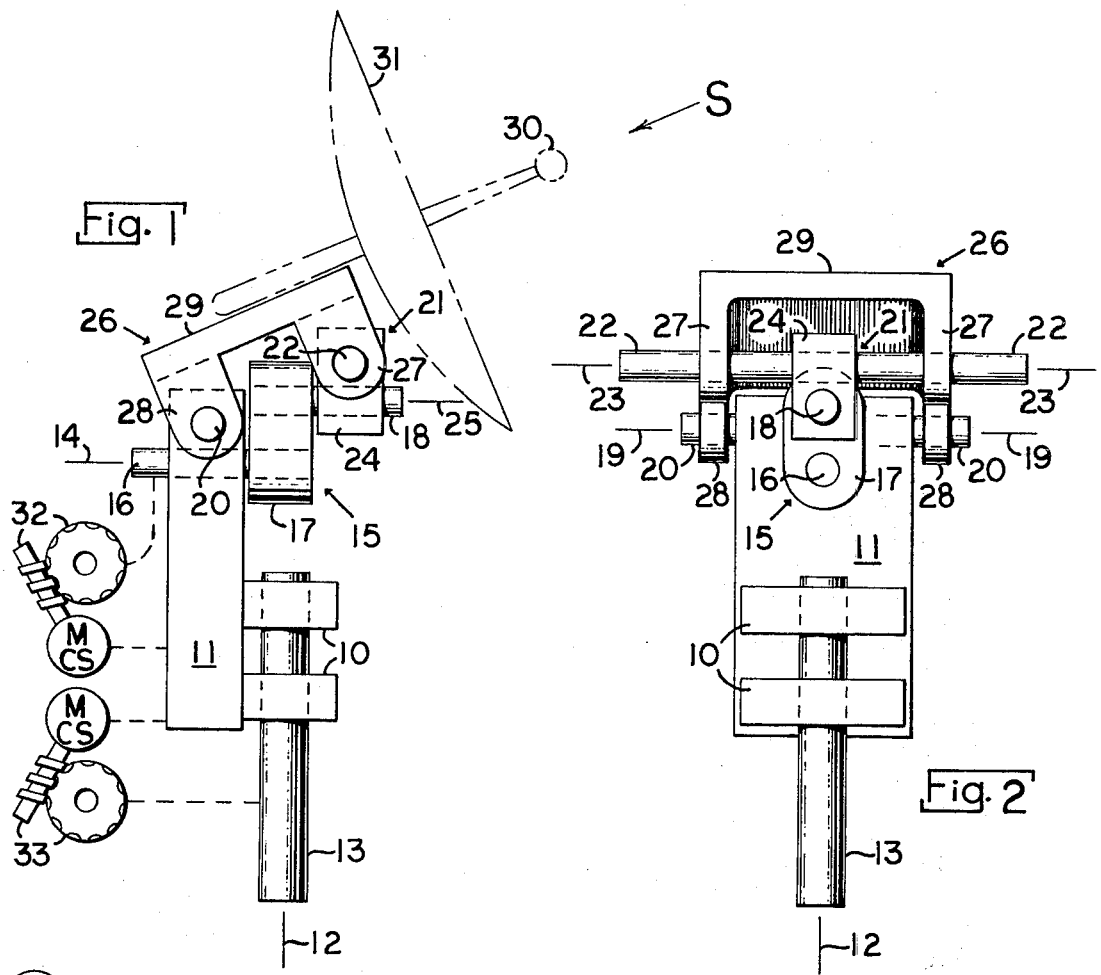
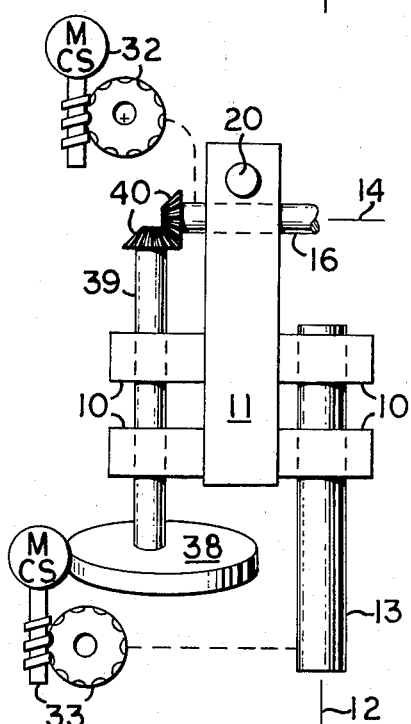
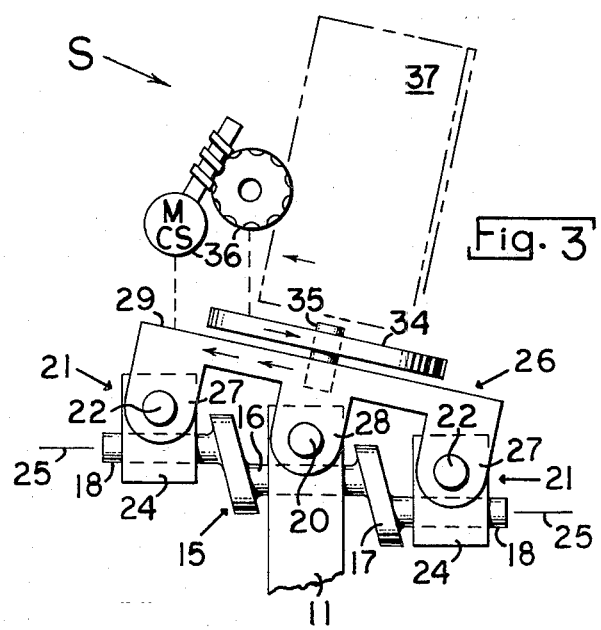

AUTOMATIC BIAXIAL SUN TRACKING MECHANISM FOR SUN RAY UTILIZATION DEVICES

CROSS REFERENCE

Herein is disclosed an automatic biaxial sun tracking mechanism for sun ray utilization devices. The applicant presently has two similar inventions pending in the Patent Office: Ser. No. 889,215 filed Mar. 23, 1978, now U.S. Pat. No. 4,195,905 and Ser. No. 35,425 filed May 2, 1979.

Whereas the distinguishing features of the foregoing noted inventions include a declination disk and a declination shaft, the instant invention is distinguished by a declination crankshaft.

The instant invention is merely another simple means of accomplishing long range, accurate and automatic sun tracking in both right ascension and declination courses. As in the foregoing noted inventions, the instant invention may have mounted thereon any desired sun ray utilization device.

One advantage of the instant invention is that the mechanism's operation is much easier to comprehend than foregoing noted inventions in that automatic declination (seasonal) adjustment is readily related to a unit circle and a table of trigonometric sines, and after cross checking with an ephemeris any doubt is soon removed as to whether the instant invention or foregoing noted inventions are merely simplistic approximations to or highly sophisticated yet accurate, simple and inexpensive solutions to the previously difficult problem of sun tracking.

Another advantage of the invention is that the mechanism is of such arrangement as to permit the firm mounting of sun ray utilization devices having massive weights and proportions.

Another advantage of the invention is that the mechanism lends itself to the same simple and accurate mechanical corrective compensating means used in the foregoing noted inventions.

The greatest advantages of the invention may be summarized as follows:

1. Because of design simplicity, it is very easy to manufacture,
2. Compared to the foregoing noted inventions, it is more compact resulting in minimal weight and materials,
3. Field adjustment, when needed, is simple, and
4. When properly manufactured, maintenance is almost negligible. Annual lubrication and, perhaps, the replacement of a timing motor once every five years are realistic maintenance projections.

BRIEF SUMMARY

The instant invention operates on the basic principle of the equatorial mount with the novel addition of a declination crankshaft having once yearly rotation which guides the seasonal position of a pivoting mount structure while connecting members holding said crankshaft and said mount structure are rotated once daily about an axis parallel to the earth's axis of rotation, thereby providing long range, accurate, and automatic biaxial sun tracking for any desired sun ray utilization device that is properly supported and positioned on said mount structure of said invention.

Extremely accurate sun tracking is possible by the incorporation of corrective compensating means applied to the main rotational means of the instant invention.

DESCRIPTION OF THE VIEWS

FIG. 1 is a side elevational view embodying the basic form of the invention as it is used for "direct tracking." It is helpful to consider this Figure as in the sunrise position, northern hemisphere, summer solstice, arrow "S" indicating the sun's direction from the east-northeast.

FIG. 2 is a front elevational view of FIG. 1. The reflective dish and target arrangement shown in phantom lines in FIG. 1 is omitted in FIG. 2 for clarity.

FIG. 3 is a partial side elevational view embodying modifications applied to the crankshaft and mount structure for "indirect tracking." It is helpful to consider this Figure as in the sunset position, northern hemisphere, summer solstice, arrow "S" indicating the sun's direction from the west-northwest, and the viewer situated in the area of the remote receiver target.

FIG. 4 is a partial side elevational view embodying modifications applied to rotational means for corrective compensation.

DETAILED DESCRIPTION

FIGS. 1 and 2 depict the basic form of the invention, while FIGS. 3 and 4 depict modifications thereto. Like reference numerals throughout the Figures refer to the same or to like parts.

I. Of Basic Parts

A. Having reference to all the Figures, but especially FIGS. 1 and 2, there are pillow blocks 10 and main block 11 which are referred to collectively as connecting members. Said connecting members are held together by suitable means so that longitudinal axes 12, 14 and 19 are held in mutually perpendicular relationship.

B. Daily axis 12 is the longitudinal axis of polar shaft 13. Main journal axis 14 is the longitudinal axis of main journal 16 of declination crankshaft generally designated 15 also having arm 17 and crankpin 18. Seasonal axis 19 is the longitudinal axis of pivot pin 20.

C. Slide assembly generally designated 21 is comprised of rod 22 having longitudinal axis 23 and block 24 attached thereto having a hole to accomodate crankpin 18. Crankpin axis 25 remains perpendicular to rod axis 23 throughout operation.

D. Mount structure generally designated 26 is shown as a one piece construction for simplicity and could, but not necessarily, be comprised of several parts for ease in manufacturing. Flanges 27 have holes to accomodate bearings for rod 22, and flanges 28 have holes to accomodate bearings for pivot pin 20. Surface 29 is provided on which any desired sun ray utilization device may be mounted. Reflective dish 31 with target 30 of FIG. 1 and mirror 37 of FIG. 3, shown in phantom lines, are for reference only and comprise no part of the instant invention.

E. Rotational means 32 for declination crankshaft 15 and rotational means 33 for connecting members 10 and 11 with attaching parts are provided for proper operation of the invention.

F. Those parts in FIGS. 3 and 4 which have not yet been discussed are covered in detail in later paragraphs. It is expedient first to discuss basic operation of the invention.

II. Of Basic Operation

Having reference primarily to FIGS. 1 and 2, basic operation of the invention is as follows:

A. Polar shaft 13 is supported by suitable means (not shown) so that daily axis 12 is held parallel to the earth's axis of rotation.

B. Connecting members 10 and 11 with attaching parts are caused to rotate about said daily axis 12 by rotational means 33 at the rate of one revolution per day and in a direction opposite to the earth's axial rotation. It is evident that sun tracking about daily axis 12 is thus effected.

C. Declination crankshaft 15 is caused to rotate about its main journal axis 14 by rotational means 32 at the rate of one revolution per year and in either direction.

D. Mount structure 26 is pivotly attached to main block 11 by means of pin 20 having seasonal axis 19. Mount structure 26 alternately pivots in one direction and then in the other direction during the course of a year by means of slide assembly 21 which translates the rotary motion of crankshaft 15 into pivotal motion of mount structure 26.

E. Block 24 of slide assembly 21 is fixed to rod 22. Crankpin 18 freely engages said block 24 by means of a close tolerance hole. Rod 22 of slide assembly 21 freely engages flanges 27 of mount structure 26 by means of close tolerance holes. It is evident that the movement thus controlled about seasonal axis 19 and daily axis 12 facilitates fully automatic biaxial sun tracking.

F. The invention may be made to any desired size, and much latitude in design is permissible so long as the following proportions are carefully observed:

1. Seasonal axis 19 and rod axis 23 are parallel to each other, and the distance between said axes 19 and 23 represents the radius "R" of a unit circle which, it is evident, remains constant. The distance "D" between crankpin axis 25 and main journal axis 14 must be appropriately related to radius "R" so that the ratio of "D" to "R" equals the sine of the maximum angular difference between the earth's equatorial plane and the sun's ecliptic plane (approximately $23\frac{1}{2}°$). The equation is as follows: "D" divided by "R" equals the sine of $23\frac{1}{2}°$.

2. Furthermore, it is necessary that the distance between seasonal axis 19 and main journal axis 14 be equal to the distance between rod axis 23 and crankpin axis 25. Inherent tracking inaccuracies will result if the foregoing proportions are not observed.

III. Of Modifications Thereto

Four distinct modifications are depicted in FIGS. 3 and 4, and these modifications may be incorporated into the basic form of the invention either severally or in combination as desired to meet the operational requirements thereof.

A. The first modification relates to declination crankshaft 15 wherein instead of a single crankpin 18 as in FIG. 1, there are two crankpins 18 as in FIG. 3, said crankpins 18 being 180° apart and having their respective slide assemblies 21 engaging mount structure 26 which is extended to accomodate the dual feature. The purpose of this modification is to provide the additional strength required to properly support sun ray utilization devices of extreme sizes and weights.

B. The second modification shown in FIG. 3 relates to mount structure 26 having an additional element 34 rotatably connected thereto by means of pin 35 and having means 36 to rotate said additional element 34 relative to said mount structure 26 in the same direction as but at one half the speed of the earth's axial rotation. The rotation of element 34 when combined with rotational means 33 of FIG. 1 will result in said element 34 rotating in a direction opposite to and at a speed one half of the earth's axial rotation. Stated graphically in terms of vectors, the arrow on mirror 37 is the result of the arrows shown on additional element 34 and mount structure 26.

In addition, the relationship between "D" and "R" as previously defined is modified so that "D" divided by "R" equals the sine of one half the maximum angular difference between the equatorial and ecliptic planes (approximately $11\frac{3}{4}°$). That is, crankshaft 15 of FIG. 3 is so modified as to effect one half the displacement of crankshaft 15 in FIGS. 1 and 2.

In comparing the movements of surface 29 in FIGS. 1 and 3, it may be readily deduced that when the invention is operating properly, said surface 29 in FIG. 1 will remain parallel to the sun's ecliptic plane, while said surface 29 in FIG. 3 will remain parallel to a plane which bisects the earth's equatorial plane and the sun's ecliptic plane.

The difference in purposes between these two configurations may be summarized as follows: Whereas, the mount structure 26 of FIG. 1 is designed for "direct tracking" wherein receiver target 30 is directly lined up with the sun's rays (arrow "S") and the center of the reflective dish 31, the mount structure 26 of FIG. 3 with additional element 34 having mirror 37 mounted thereon is designed for "indirect tracking", thereby allowing said mirror 37 to move at half speed, biaxially speaking, and thus providing for the remote location of a fixed receiver target (not shown). If rotational means 36 is unidirectional, both sides of mirror 37 may be reflective, and therefore each side is used on alternate days. This modification would find appropriate applications as a solar telescope and a solar furnace, whereas the basic form of the invention shown in FIGS. 1 and 2 would find appropriate applications in power generation, heating and cooling.

C. Having special reference to FIG. 4, but other Figures as well, the third modification relates to rotational means 32, wherein worm gear of rotational means 32 is positioned eccentrically (note eccentric hole in graphic symbol of means 32, FIG. 4) relative to main journal axis 14 thereby allowing main journal 16 of declination crankshaft 15 to rotate at a rate which will result in seasonal adjustment of mount structure 26 conforming precisely to the actual rate of the sun's declination movement, and this may be confirmed by drawing a graph relating crankpin 18 position to mount structure 26 position and checking the graph against the declination data in an ephemeris.

The amount and direction of eccentricity is based upon the fact that it takes the earth approximately one week longer (about 2% of a year) to travel from equinox to equinox through summer than it does to travel from equinox to equinox through winter.

D. The fourth, and final, modification relates to rotational means 33 depicted in FIG. 4, wherein said means 33 has superimposed upon it the additional movement of an "equation of time" cam 38 having camshaft 39 suitably supported by additional pillow blocks 10 and having means 32 for rotation via miter gears 40 at the rate of one revolution per year. The curve of said cam 38 must be compatible with direction of rotation of means 32 and the amplitude of said curve must be properly related to the distance between parallel longitudinal axes of camshaft 39 and polar shaft 13. The purpose of this modification is to bring rotation about daily axis 12 of connecting members 10 and 11 with attaching parts into precise conformity with the apparent speed of the sun, thereby providing fully accurate tracking about daily axis 12.

The modifications to rotational means 32 and 33 depicted in FIG. 4 have been somewhat schematized in the drawing for clarity and simplicity, but it should be noted that these modifications are the same as those specified in the appropriate Figures and sections relating to corrective compensation of the two cross referenced inventions.

IV. Concluding Remarks

A. The preferred embodiment of the invention comprises the basic form of the invention as shown in FIGS. 1 and 2 with whatever modifications each specific application may require.

B. As has been shown in the foregoing description, there are set principles, ratios, and data which must be carefully considered in the construction of the instant invention. However, although the drawings do closely conform to the model the inventor has built, said drawings are for illustrative purposes only, and various changes in design, structure and arrangement may be made thereto without departing from the spirit and scope of the invention as described and claimed. Some of these changes have been briefly mentioned. Other changes include:

1. Polar shaft 13 is shown stationary, but rotation about daily axis 12 also could be effected by rotating the polar shaft itself in a suitable bearing support structure.

2. Rotational means 32, 33, and 36 are unidirectional, continuously operable, constant speed motors with worms enmeshing worm gears. Other means of gearing together with other means of rotation including reversible and intermittently operable means with or without sensing and/or controlling circuits also may be used.

3. Slide assembly 21 could be so arranged that rod 22 is fixed to flanges 27, and block 24 slides with respect to rod 22. Since the preferred slide assembly 21 performs a linking function, it is referred to as a "linkage" in the claims, because there are many designs, structures and arrangements which would serve the same purpose, the one illustrated being about the most simple and forthright.

In all, it is expected that manufacturing products, materials, and methods will be experimented with until the most economical design, structure and arrangement is achieved.

Having thus described my invention, what I claim as new and desire by Letters Patent of the United States is as follows:

1. An automatic biaxial sun tracking mechanism for sun ray utilization devices comprising means for continuously orienting said devices relative to the sun, said means including a mount structure for supporting and positioning said sun ray utilization devices, a polar shaft, a declination crankshaft, and suitable connecting members:
   A. said suitable connecting members providing connection between said mount structure, said polar shaft, and said declination crankshaft and arranged to maintain a mutually perpendicular relationship of (1) the longitudinal axis (daily axis) of said polar shaft, (2) the longitudinal axis (main journal axis) of said declination crankshaft, and (3) the longitudinal axis (seasonal axis) of a pivoting means for said mount structure;
   B. said polar shaft having its daily axis oriented parallel to the earth's axis of rotation and having means to rotate said suitable connecting members with attached parts about said daily axis;
   C. said declination crankshaft having rotary motion effecting alternating pivotal movement of said mount structure about said seasonal axis by means of a crankpin having a suitable linkage with said mount structure, and said declination crankshaft having means for rotation about its main journal axis.

2. In a mechanism as defined in claim 1, wherein means are provided for moving said mount structure in a path parallel to the sun's ecliptic plane.

3. In a mechanism as defined in claim 1, wherein:
   A. means are provided for moving said mount structure in a path parallel to a plane which bisects the earth's equatorial plane and the sun's ecliptic plane;
   B. said mount structure has an additional element upon which said sun ray utilization devices are mounted, rotatably connected to said mount structure and with suitable means for rotation relative to said mount structure.

4. In a mechanism as defined in claim 1, wherein said declination crankshaft has two crankpins each crankpin having its respective linkage engaging said mount structure.

5. In a mechanism as defined in claim 2, wherein mechanism movement is as follows:
   A. said connecting members with attached parts rotate about said daily axis one revolution per day in a direction opposite to the earth's axial rotation;
   B. said declination crankshaft rotates one revolution per year about its main journal axis;
   C. said mount structure alternately pivots about the seasonal axis in one direction and then in the other direction during the course of a year, the maximum displacement between reversal points being equal to two times the maximum angular difference between the earth's equatorial plane and the sun's ecliptic plane.

6. In a mechanism as defined in claim 3, wherein mechanism movement is as follows:
   A. said connecting members with attached parts rotate about said daily axis one revolution per day in a direction opposite to the earth's axial rotation;
   B. said declination crankshaft rotates one revolution per year about its main journal axis;
   C. said mount structure alternately pivots about the seasonal axis in one direction and then in the other direction during the course of a year, the maximum displacement between reversal points being equal to the maximum angular difference between the earth's equatorial plane and the sun's ecliptic plane;
   D. said additional element rotates relative to said mount structure in a direction opposite to and at a speed one half of said connecting members with attached parts.

7. In a mechanism as defined in claim 1, wherein corrective compensation is applied to said declination crankshaft rotational means by orienting said rotational means eccentrically.

8. In a mechanism as defined in claim 1, wherein corrective compensation is applied to the rotational means for said connecting members with attached parts by means of a rotating cam, said cam adding its movement to said rotational means.

9. In a mechanism as defined in claim 1, wherein each said means for rotation is one of the following:

A. unidirectional and continuously operable,
B. unidirectional and intermittently operable,
C. reversible and continuously operable,
D. reversible and intermittently operable.

* * * * *